US009717031B2

(12) United States Patent
Centonza et al.

(10) Patent No.: US 9,717,031 B2
(45) Date of Patent: Jul. 25, 2017

(54) MANAGEMENT OF RESOURCES AMONGST PARTIES SHARING THE SAME RADIO ACCESS NETWORK

(71) Applicant: Telefonaktiebolaget L M Ericsson (Publ), Stockholm (SE)

(72) Inventors: Angelo Centonza, Winchester (GB); Mats Buchmayer, Stockholm (SE); Icaro L. J. da Silva, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/429,419

(22) PCT Filed: Jan. 29, 2015

(86) PCT No.: PCT/SE2015/050097
§ 371 (c)(1),
(2) Date: Mar. 19, 2015

(87) PCT Pub. No.: WO2015/115984
PCT Pub. Date: Aug. 6, 2015

(65) Prior Publication Data

US 2016/0014665 A1 Jan. 14, 2016

Related U.S. Application Data

(60) Provisional application No. 61/934,030, filed on Jan. 31, 2014.

(51) Int. Cl.
*H04W 36/30* (2009.01)
*H04W 28/08* (2009.01)
(Continued)

(52) U.S. Cl.
CPC ........... *H04W 36/30* (2013.01); *H04L 47/781* (2013.01); *H04W 28/08* (2013.01); *H04W 36/22* (2013.01);
(Continued)

(58) Field of Classification Search
CPC ..... H04W 36/30; H04W 36/22; H04W 28/08; H04W 84/042; H04W 92/20; H04W 24/00; H04W 24/08; H04L 47/781; H04L 41/00
See application file for complete search history.

(56) References Cited

U.S. PATENT DOCUMENTS

2010/0039978 A1* 2/2010 Rangan ................ H04L 12/189 370/312
2013/0143542 A1* 6/2013 Kovvali ................ H04W 48/18 455/418
(Continued)

FOREIGN PATENT DOCUMENTS

GB 2 490 968 A1 11/2012
GB 2490968 * 11/2012 ............ H04W 28/08

OTHER PUBLICATIONS

3GPP TSG-RAN Meeting #62 RP-132089 Busan, Korea, Source: NEC, Bell Canada, e-Access, InterDigital, Orange, Softbank, Sprint, Telefonica, Telenor, TeliaSonera Title: Proposed SI: RAN Aspects of RAN Sharing Enhancements for LTE, Document for: Approval, Agenda Item: 3GPP™ Work Item Description, Dec. 3-6, 2013 consisting of 5-pages.
(Continued)

*Primary Examiner* — Brandon Miller
(74) *Attorney, Agent, or Firm* — Christopher & Weisberg, P.A.

(57) ABSTRACT

A method and system for reporting cell resource utilization associated with a plurality of operators sharing resources of a cell are disclosed. According to one aspect, a method includes associating each of a plurality of operators with a
(Continued)

different one of a plurality of public land mobile networks, PLMNs. The method includes monitoring cell resource utilization for each PLMN. The method also includes transmitting cell resource utilization for each one of at least one of the plurality of PLMNs.

13 Claims, 13 Drawing Sheets

(51) Int. Cl.
*H04W 36/22* (2009.01)
*H04L 12/911* (2013.01)
*H04W 84/04* (2009.01)
*H04W 24/08* (2009.01)
*H04W 92/20* (2009.01)

(52) U.S. Cl.
CPC .......... *H04W 24/08* (2013.01); *H04W 84/042* (2013.01); *H04W 92/20* (2013.01)

(56) References Cited

U.S. PATENT DOCUMENTS

2013/0303114 A1* 11/2013 Ahmad et al. ................ 455/406
2014/0148165 A1* 5/2014 Serravalle ............. H04W 16/14 455/436

OTHER PUBLICATIONS

3GPP TS 22.101 V13.1.0 3rd Generation Partnership Project; Technical Specification Group Services and System Aspects; Service aspects; Service principles (Release 13) Dec. 2013 consisting of 84-pages.
3GPP TS 36.413 V12.0.0 3rd Generation Partnership Project; Technical Specification Group Radio Access Network; Evolved Universal Terrestrial Radio Access Network (E-UTRAN); S1 Application Protocol (S1AP) (Release 12) Dec. 19, 2013 consisting of 278-pages.
3GPP TS 36.423 V12.0.0 3rd Generation Partnership Project; Technical Specification Group Radio Access Network; Evolved Universal Terrestrial Radio Access Network (E-UTRAN); X2 application protocol (X2AP) (Release 12) Dec. 19, 2013 consisting of 144-pages.
International Search Report and Written Opinion dated Jun. 30, 2015 for International Application Serial No. PCT/SE2015/050097, International Filing Date—Jan. 29, 2015 consisting of 10-pages.

* cited by examiner

| IE/Group Name | Presence | Range | IE type and reference | Semantics description | Critically | Assigned Critically |
|---|---|---|---|---|---|---|
| Message Type | M | | 9.2.13 | | YES | ignore |
| Cell Information | M | | | | YES | ignore |
| >Cell Information Item | | 1 .. <maxCellineNB> | | | EACH | ignore |
| >>Cell ID | M | | ECGI 9.2.14 | Id of the source cell | – | – |
| >>UL Interference Overload Indication | O | | 9.2.17 | | – | – |
| >>UL High Interference Information | | 0 .. <maxCellineNB> | | | – | – |
| >>>Target Cell ID | M | | ECGI 9.2.14 | Id of the cell for which the HII is meant | – | – |
| >>>UL High Interference Indication | M | | 9.2.18 | | – | – |
| >>Relative Narrowband Tx Power (RNTP) | O | | 9.2.19 | | – | – |
| >>ABS Information | O | | 9.2.54 | | YES | ignore |
| >>Invoke Indication | O | | 9.2.55 | | YES | ignore |

(Prior Art)
*FIG. 1*

| IE/Group Name | Presence | Range | IE type and reference | Semantics description | Critically | Assigned Critically |
|---|---|---|---|---|---|---|
| Message Type | M | | 9.2.13 | | YES | ignore |
| eNB1 Measurement ID | M | | INTEGER (1..4095,...) | Allocated by $eNB_1$ | YES | reject |
| eNB2 Measurement ID | M | | INTEGER (1..4095,...) | Allocated by $eNB_2$ | YES | reject |
| Cell Measurement Result | | 1 | | | YES | ignore |
| Cell Measurement Result Items | | 1 .. <maxCellineNB> | | | EACH | ignore |
| >>Cell ID | M | | ECGI 9.2.14 | | – | – |
| >>Hardware Load Indicator | O | | 9.2.34 | | – | – |
| >>S1 TNL Load Indicator | O | | 9.2.35 | | – | – |
| >>Radio Resource Status | O | | 9.2.37 | | – | – |
| >>Composite Available Capacity Group | O | | 9.2.44 | | YES | ignore |
| >>ABS Status | O | | 9.2.58 | | YES | ignore |

(Prior Art)
*FIG. 2*

| IE/Group Name | Presence | Range | IE type and reference | Semantics description | Critically | Assigned Critically |
|---|---|---|---|---|---|---|
| Message Type | M | | 9.2.13 | | YES | reject |
| eNB1 Measurement ID | M | | INTEGER (1..4095,...) | Allocated by $eNB_1$ | YES | reject |
| eNB2 Measurement ID | C-ifRegistrationRequestStop | | INTEGER (1..4095,...) | Allocated by $eNB_2$ | YES | ignore |
| 13 Registration Request | M | | ENUMERATED(start, stop, ...) | A value set to "stop", indicates a request to stop all cells measurements. | YES | reject |
| Report Characteristics | O | | BITSTRING (SIZE(32)) | Each position in the bitmap indicates measurement object the $eNB_2$ is requested to report. First Bit=PRB Periodic, Second Bit=TNL load Ind Periodic, Third Bit=HW Load Ind Periodic, Fourth Bit=Composite Available Capacity Periodic, this bit should be set to 1 if at least one of the First, Second or Third bits is set to 1, Fifth Bit=ABS Status Periodic. Other bits shall be ignored by the eNB2. | YES | reject |
| Cell To Report | | 1 | | Cell ID list for which measurement is needed | YES | ignore |
| >Cell To Report Item | | 1 .. <maxCellineNB> | | | EACH | ignore |
| >>Cell ID | M | | ECGI 9.2.14 | | | |
| >>RAN Sharing Report-IE1 | O | ENUMBERATED(per PLMN, perPLMN Group,...) | | | | |
| Reporting Periodicity | O | | ENUMERATED(1000ms, 2000ms, 5000ms, 10000ms, ...) | | YES | ignore |
| Partial Success Indicator | O | | ENUMERATED(partial success allowed, ...) | Included if partial success is allowed | YES | ignore |

| IE/Group Name | Presence | Range | IE type and reference | Semantics description | Critically | Assigned Critically |
|---|---|---|---|---|---|---|
| Message Type | M | | 9.2.13 | | YES | ignore |
| eNB1 Measurement ID | M | | INTEGER (1..4095,...) | Allocated by $eNB_1$ | YES | reject |
| eNB2 Measurement ID | M | | INTEGER (1..4095,...) | Allocated by $eNB_2$ | YES | reject |
| Cell Measurement Result | | 1 | | | YES | ignore |
| Cell Measurement Result Items | | 1 .. <maxCellineNB> | | | EACH | ignore |
| >>Cell ID-IE2 | M | | ECGI 9.2.14 | | | |
| >>PLMN ID-IE3 | | | Enumerated (0...MaxPLMNIDList) | Indicates the list of PLMN IDs in the group belonging to a sharing operator | | |
| >>>PLMN ID-IE4 | M | | 9.2.4 | | | |
| Hardware Load Indicator-IE5 | O | | 9.2.34 | | | |
| >>S1 TNL Load Indicator-IE6 | O | | 9.2.35 | | | |
| >>Radio Resource Status-IE7 | O | | 9.2.37 | | | |
| >>Composite Available Capacity Group-IE8 | O | | 9.2.44 | | YES | ignore |
| >>ABS Status-IE9 | O | | 9.2.58 | | YES | ignore |

| IE/Group Name | Presence | Range | IE type and reference | Semantics description |
|---|---|---|---|---|
| >Cell Capacity Class Value | M | | INTEGER (1..100,...) | Value 1 shall indicate the minimum call capacity, and 100 shall indicate the maximum cell capacity. There should be a linear relation between cell capacity and Cell Capacity Class Value. |
| >Cell Capacity Class | | 1 .. <maxnoofPLMNClassValueList) | | List indicating one or more PLMN ID and their overall class value |
| >>PLMN List-IE10 | | | Enumerated (0...MaxPLMNIDList) | indicates the list of PLMN IDs in the group belonging to a sharing operator |
| >>>PLMN ID-IE11 | M | | 9.2.4 | |
| >>Capacity Value User Plane | M | | INTEGER (1..100) | This is the class value for the overall group of PLMN IDs indicated in the PLMN List.<br>Value 0 shall indicate no available capacity, and 100 shall indicate maximum available capacity for user plane resources. capacity Value should be measured on a linear scale. |
| >>Capacity Value Control Plane | M | | INTEGER (1..100) | This is the class value for the overall group of PLMN IDs indicated in the PLMN List.<br>Value 0 shall indicate no available capacity, and 100 shall indicate maximum available capacity for control plane resources. capacity Value should be measured on a linear scale. |

| IE/Group Name | Presence | Range | IE type and reference | Semantics description | Critically | Assigned Critically |
|---|---|---|---|---|---|---|
| Message Type | M | | 9.2.13 | | YES | reject |
| eNB1 Cell ID | M | | ECGI 9.2.14 | | YES | reject |
| eNB2 PLMN List–IE12 | O | | Enumerated (0...MaxPLMN IDList) | Indicates the list of PLMN IDs for the cell in $eNB_1$ where mobility settings need be changed | | |
| >PLMN ID–IE13 | M | | 9.2.4 | | | |
| eNB2 Cell ID | M | | ECGI 9.2.14 | | YES | reject |
| eNB1 PLMN List–IE14 | O | | Enumerated (0...MaxPLMN IDList) | Indicates the list of PLMN IDs for the cell in eNB where mobility settings need be changed | | |
| >PLMN ID–IE15 | M | | 9.2.4 | | | |
| eNB1 Mobility Parameters | O | | Mobility Parameters Information 9.2.48 | Configuration change in $eNB_1$ cell | YES | ignore |
| eNB2 Proposed Mobility Parameters | M | | Mobility Parameters Information 9.2.48 | Proposed configuration change in $eNB_2$ cell | YES | reject |
| Cause | M | | 9.2.6 | | YES | reject |

*FIG. 8*

MANAGEMENT OF RESOURCES AMONGST PARTIES SHARING THE SAME RADIO ACCESS NETWORK

FIELD

Wireless network communications and in particular to a method and system for reporting cell resource utilization in a radio access network (RAN) by a plurality of operators.

BACKGROUND

Current third generation partnership project (3GPP) specifications only allow reporting of load-related parameters on a per cell basis, i.e., a given cell is able to request its neighbor cell's load parameters and get periodic load reports when both cells are configured by the same mobile network operator. This allows mechanisms for load distribution and balancing to work on a per cell basis. However, multiple partners (mobile operators) could share resources within a cell. For example Mobile Virtual Network Operators (MVNOs) can "lease" a portion of the resources in a cell and in nearby cells. In these scenarios, current wireless architectures do not allow reporting of cell resource utilization at the per-operator level, but rather, resource utilization reports are made on a per cell basis. This prevents load distribution and balancing to work correctly in the presence of sharing operators.

For example, if Long Term Evolution (LTE) is considered, the signaling that allows different evolved node B (eNB) base stations to exchange cell related resource utilization information consists of the messages shown in FIGS. 1 and 2. FIG. 1 is a load information message and FIG. 2 is a resource status update message. As can be seen in these two figures, the cell identification (CID) is present so that information reported by one eNB to another eNB over the X2 interface are provided on a per cell basis. This means, for example, that a load on cells due to user equipment (UE) associated with one particular operator, as opposed to another operator, cannot be reported on a per-operator basis with the current messaging. Other procedures in LTE networks and similar procedures in other different radio access technologies (RAT), such as overload start and overload stop, and the inter-RAT radio access network (RAN) information management (RIM) based cell load report, suffer the same drawbacks.

Thus, resource management within a RAN does not differentiate between different parties sharing the same RAN. For example, functions for load balancing have been standardized to allow resource optimization between cells, but not among operators within cells or between cells. Thus, the 3GPP standards do not specify how to signal within a RAN, or between RAN nodes, information that can aid in deducing load, resource utilization, available capacity or an overload event with a granularity that exceeds the per-cell level. A per-cell granularity is insufficient when control of resources, load and available capacity need to be maintained on a per-sharing-operator basis. For example, without per-sharing operator load reporting, proper mechanisms for load balancing in RAN sharing scenarios cannot be achieved.

SUMMARY

Embodiments advantageously provide a method and system for reporting resource utilization associated with a plurality of operators sharing resources of a cell. According to one aspect, a method includes associating each of a plurality of operators with a different one of a plurality of public land mobile networks (PLMNs). The method includes monitoring resource utilization for each PLMN. The method also includes transmitting resource utilization for each one of at least one of the plurality of PLMNs.

According to this aspect, in some embodiments, the resource utilization is contained in a resource status report communicated over an interface to a requesting base station from a base station serving the cell. In some embodiments, the interface is a third generation partnership project, 3GPP, X2 interface. In some embodiments, the transmitted resource utilization includes control plane resources utilized by each of the plurality of PLMNs. In some embodiments, the transmitted resource utilization includes data plane resources utilized by each of the plurality of PLMNs. In some embodiments, the method further includes determining if a cell resource utilization of an operator exceeds a resource utilization threshold. In some embodiments, when a cell resource utilization of a first cell by an operator exceeds the resource utilization threshold, at least one user equipment associated with the operator and in communication via the first cell is handed over from the first cell to a second cell. In some embodiments, when cell resource utilization by the plurality of operators exceeds a resource utilization threshold for the cell, at least one user equipment associated with an operator and in communication via the cell are handed over to another cell. In some embodiments, when a cell resource utilization by an operator exceeds the resource utilization threshold, an unallocated portion of cell resources is reallocated to the operator whose cell resource utilization exceeds the resource utilization threshold. In some embodiments, an unallocated portion of resources is reallocated to the operator exceeding the resource utilization threshold until an allocation of all cell resources exceeds a predetermined amount. In some embodiments, the method further includes receiving a mobility change request indicating a requested change in a mobility parameter for at least one public land mobile network (PLMN) associated with an operator. The mobility parameter is changed as requested. The changed mobility parameter is applied to handoff decisions for the operator to alter a resource utilization of at least one PLMN.

According to another aspect, some embodiments provide a base station configured to serve at least one cell having resources shared by a plurality of operators. The base station includes a processor, a memory and a communication interface. The memory is configured to store cell resource utilizations per operator of the plurality of operators. The memory is further configured to contain instructions executable by the processor to configure the processor to monitor cell resource utilization by each of the plurality of operators. The communication interface is configured to receive a request for cell resource utilizations by each of the plurality of operators, and to transmit cell resource utilizations by each of the plurality of operators.

According to this aspect, in some embodiments, the communication interface is configured to receive the request from another base station. In some embodiments, the communication interface is configured to receive the requests over a third generation partnership project, 3GPP, X2 interface. In some embodiments, the processor is configured to determine an amount of cell resource utilization by an operator by determining an amount of cell resource utilization for each public land mobile network, PLMN, associated with the operator. In some embodiments, the processor is configured to cause handover of at least one user equipment from an operator of the plurality of operators whose cell resource utilization exceeds a resource utilization threshold.

According to yet another aspect, embodiments include a base station configured to serve at least one cell having resources to be shared by a plurality of operators. The base station includes a cell resource utilization monitoring module configured to monitor cell resource utilization of each of the plurality of operators; and a cell resource utilization reporting module configured to transmit for each of at least one of the operator, the cell resource utilization of the operator.

According to this aspect, in some embodiments, the base station further included a threshold comparison module configured to determine if a cell resource utilization of an operator exceeds the resource utilization threshold. In some embodiments, the transmitting is in response to a resource status request message from a neighboring base station. In some embodiments, the base station further includes a handover control module configured to effect a handover of at least one user equipment from an operator whose cell resource utilization exceeds a resource utilization threshold.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 1 is a load information message according to known methods;

FIG. 2 is a resource status update message according to known methods;

FIG. 5 shows an information element named RAN sharing report added to a resource status response message that enables reporting parameters on a per PLMN or PLMN group basis;

FIG. 6 shows information elements added to a resource status update message to enabling reporting status of PLMNs utilizing a cell for each of a plurality of cells of a base station;

FIG. 7 shows a composite available capacity information element for each PLMN of a sharing operator;

FIG. 8 shows changes to a mobility change request message that affects mobility parameters on a per PLMN basis;

DETAILED DESCRIPTION

Figure 3:
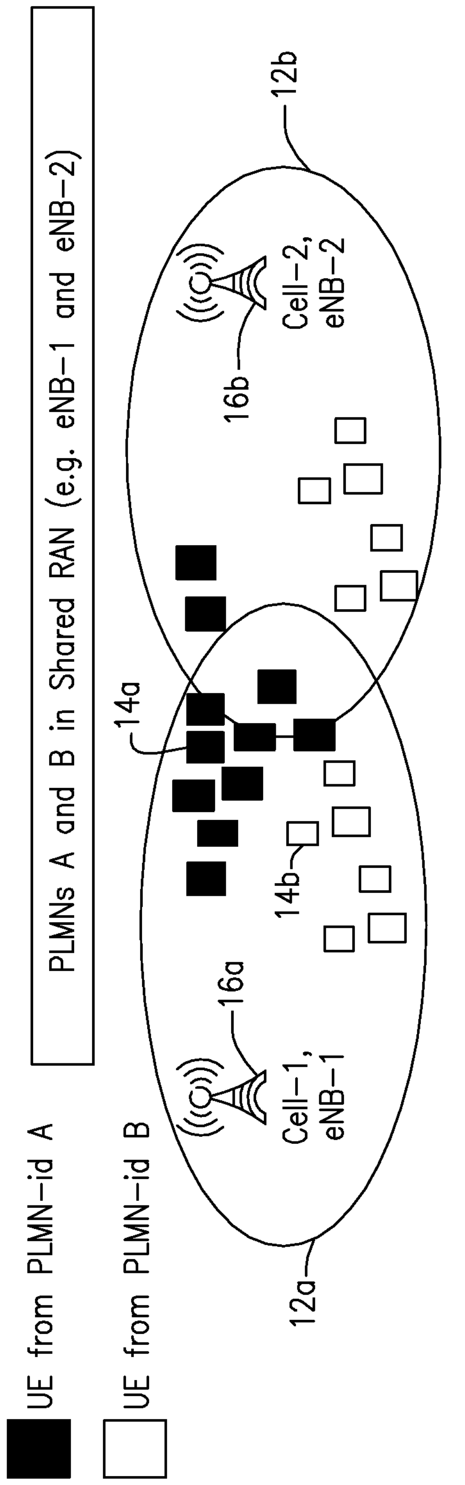
FIG. 3 is a diagram of two cells overlapping and serving UEs associated with two different PLMNs.

Before describing in detail exemplary embodiments that are in accordance with the present disclosure, it is noted that the embodiments reside primarily in combinations of apparatus components and processing steps related to reporting of per-operator cell resource utilization and load balancing. Accordingly, the device, system and method components have been represented where appropriate by conventional symbols in the drawings, showing those specific details that are pertinent to understanding the embodiments of the present disclosure.

As used herein, relational terms, such as "first" and "second," "top" and "bottom," and the like, may be used solely to distinguish one entity or element from another entity or element without necessarily requiring or implying any physical or logical relationship or order between such entities or elements.

In the following description the example of LTE networks is used. However, the methods described hereby are applicable to any radio access technology and/or systems where it is desirable to share intra-cell radio resources among different parties such as different operators.

In some scenarios, wireless network operators may decide to share resources of a cell on unequal terms. For example, one operator might have more cell capacity allocated than another sharing operator(s), e.g., a 60/40 split. Further, in some scenarios, network sharing may include a split between two or more operators as well as a commonly shared set of resources, e.g., 30% dedicated to operator A, 20% dedicated to operator B and 50% shared resources. FIG. 3 shows unequal allocation of intra-cell resources among two different operators, each operator associated with a different public land mobile network (PLMN).

Embodiments described herein allow for monitoring of cell resource utilization per PLMN or PLMN group, i.e., per sharing operator, and reporting of cell resource utilization per PLMN or PLMN group, from one base station to another, when cell resources are equally or unequally allocated to a number of sharing operators. The reporting of cell resource utilization per PLMN or PLMN group may be performed according to messaging formats proposed herein. Also, mobility load balancing allows for migration of UEs from one cell to another based on cell resource utilization exceeding a resource utilization threshold or an amount of total utilized cell resources exceeding a predetermined amount.

In FIG. 3, a first cell 12*a* of a first base station, eNB-1, and a second cell 12*b* of a second base station, eNB-2, referred to herein collectively as cells 12, each serve the UEs 14*a* and 14*b*, herein referred to collectively as UEs 14, of two different PLMNs. Each PLMN is associated with a different operator and may be allocated a different share of the resources of a cell 12. For example, in the cell 12*a* of eNB-1, a first amount r1 of resources are allocated to PLMN A and a second amount r2 of resources are allocated to PLMN B.

Figure 4:
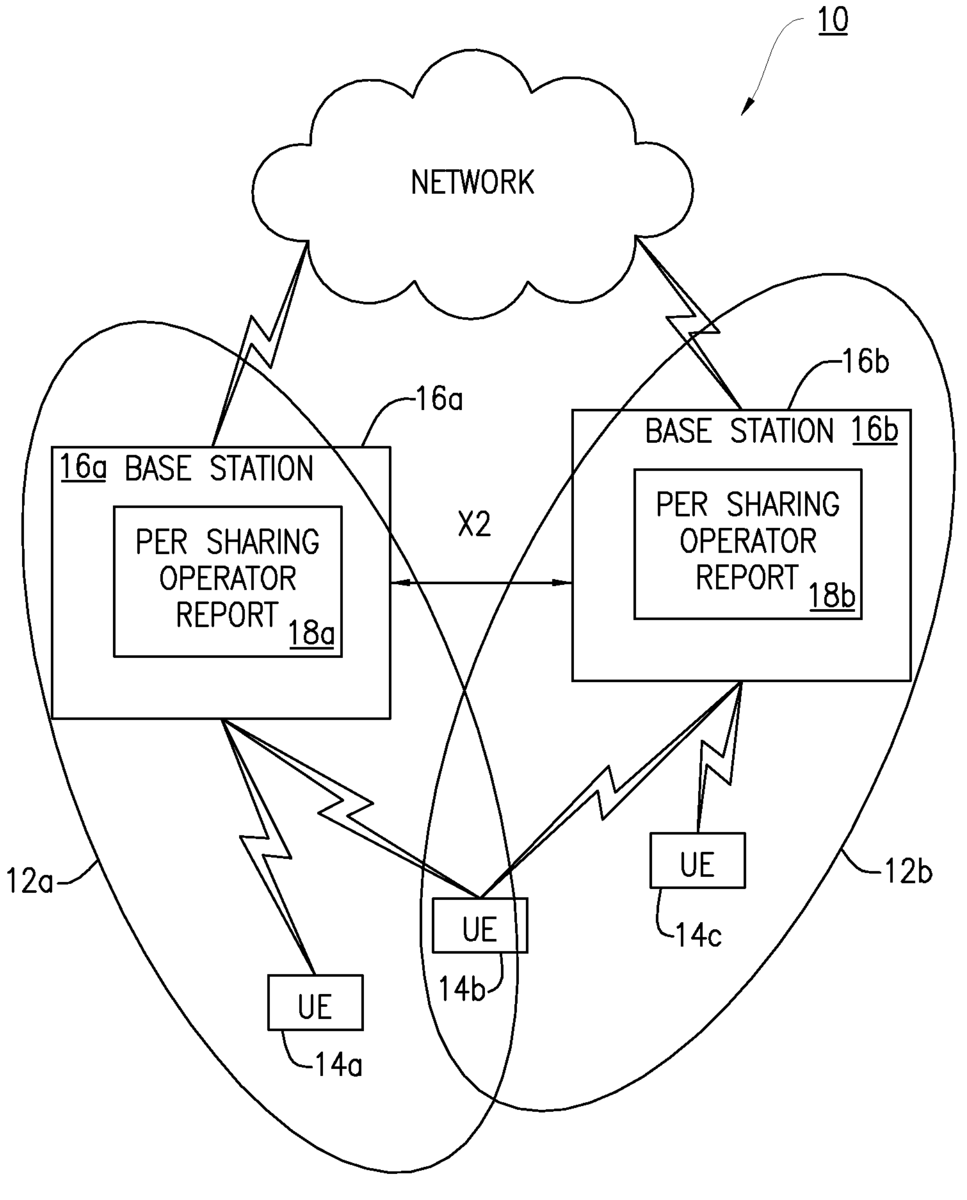
FIG. 4 is a block diagram of a wireless communication network having a plurality of base stations, cells and UEs, the base stations being equipped to report cell resource utilization per sharing operator.

FIG. 4 is a block diagram of a wireless network with a first cell 12*a* served by a first base station 16*a* and a second cell 12*b* served by a second base station 16*b*, the cells being referred to collectively as cells 12, and the base stations being referred to collectively as base stations 16. Each cell serves one or more UEs 14*a*-14*c*, referred to collectively as UEs 14. The base stations 16 may be in communication with the network 10 via a backhaul link and may be connected to each other via an X2 interface. Note that more than the number of base stations, cells, and UEs than are shown in FIG. 4 may be included in a wireless communication system. The number of base stations, cells and UEs shown in FIG. 4 are shown to illustrate principles of embodiments described herein. In an actual deployment there may be many more base stations, cells and UEs. Further, each base station may serve more than one cell, even though only one cell per base station is shown in FIG. 4. Also, although the cells 12*a* and 12*b* overlap, base stations may also serves cells that do not overlap.

The base stations 16*a* and 16*b* may each store a per sharing operator report 18*a* and 18*b*, respectively, referred to collectively per sharing operator reports 18. A per sharing operator report 18 includes cell resource utilization for each of a plurality of public land mobile networks (PLMN). The cell resource utilization may include data plane and control plane resources utilized by each PLMN. Each sharing operator has associated therewith at least one PLMN. The cell resource utilization for each sharing operator may therefore be stored as cell resource utilization per PLMN or group of PLMNs. In other words, an operator may be associated with one or more PLMNs but a PLMN may be associated with only one operator, in some embodiments.

The two base stations 16*a* and 16*b* may exchange cell resource utilization parameters such as hardware load, and interface signaling load between neighboring eNBs on a per-PLMN or per-PLMN-group basis. In some embodiments, each eNB is configured with information about the list of PLMN IDs associated with each sharing operator. For example, such configuration might occur by means of signaling via an Operation, Administration and Maintenance (OAM) system that includes a domain manager that communicates with the base stations 16.

On the basis of such PLMN ID grouping, the conventional X2: RESOURCE STATUS REQUEST message may be enhanced with an extra parameter, indicating a per-sharing-operator reporting of load related parameters. This can be achieved either with a new information element (IE) in the X2: RESOURCE STATUS REQUEST message 13 that flags the reporting of cell resource utilization on a per-PLMN or per-sharing-operator basis or by the introduction of new IEs indicating request of per-sharing-operator or per-PLMN reporting for each requested parameter.

As an example, FIG. 5 shows how a new IE, named RAN Sharing Report ID, is added for each cell for which resource utilization is to be reported. This IE enables reporting on a per-PLMN or per-PLMN-group basis. Another alternative is to define new values in the Report Characteristics IE, where new positions in the bitmap could be defined to specify one or more of the following resource utilization quantity reports:

- per-PLMN physical resource block (PRB) Periodic Reporting;
- per PLMN Group PRB Periodic Reporting;
- per PLMN transport network layer (TNL) load Indication Periodic Reporting;
- per PLMN Group TNL load Indication Periodic Reporting;
- per PLMN hardware (HW) Load Indication Periodic Reporting;
- per PLMN Group HW Load Indication Periodic Reporting;
- per PLMN Composite Available Capacity Periodic Reporting<<note to inventor—what is composite available capacity?>>;
- and per PLMN Group Composite Available Capacity Periodic Reporting.

Thus, the resource status request message of FIG. 5 may be transmitted from one base station, such as base station 16*a*, to another base station, such as base station 16*b*, requesting the base station 16*b* to report the per PLMN or PLMN group cell resource utilization.

According to enhancements for the resource status request message 13 shown in FIG. 5, a resource status response message may be enhanced with new IEs or new IE values to acknowledge the acceptance or failure of a reporting request as per-request characteristics. Similarly, a resource status failure message may be enhanced with new IEs or new IE values to acknowledge the failure of a reporting request as per-request characteristics.

In response to a resource status request requesting per-PLMN or per-PLMN-group parameters, a periodic resource status update message can be generated by the base station 16, where the requested parameters are reported in association with one or more PLMN IDs. As an example of the enhancements for the resource status update message 15, FIG. 6 shows a possible encoding of such new IEs. In FIG. 6, a Cell ID, IE2, can be reported multiple times in the list of up to a limit, "<maxCellineNB>", i.e., up to the total number of cells of the base station.

For each entry of the Cell ID IE2, a PLMN list IE 3 can be provided. For each PLMN, the attributes reported with the PLMN, e.g., Hardware Load Indicator, IE 5 which indicates a hardware load of the PLMN, S1 TNL Load Indicator, IE6, which indicates the S1 Transport Network Layer load, Radio Resource Status, IE7, which indicates utilized time and frequency resources, Composite Available Capacity Group, IE8, which indicates capacity available in the cell, a list of PLMN IDs IE4 can be provided. This list indicates that the reported parameters apply to the sharing operator to which the list of PLMN IDs has been assigned for sharing in the specific cell. Note that the almost blank subframe (ABS) Status, IE9, may be excluded from the per-PLMN or per-PLMN-group reporting, i.e., the ABS Status may take the same value (representing a per cell value) independently from the PLMN ID group that is flagged.

Another example of how the resource status update message may be modified consists of defining new IEs that take into account the PLMN ID group to which a sharing operator is associated. For example, a Composite Available Capacity message 17 is shown in FIG. 7, where the IE has been enhanced with a list of PLMN IDs, IE10, corresponding to the sharing operator sharing resources in the cell to which the value corresponds, followed by each PLMN ID, IE11, being reported.

In order to allow for reporting of signaling-load per-sharing-operators, a new IE can be defined and added to the resource status update procedure that indicates one of the following:

- Per Control Plane Resource Block utilization on a per-PLMN ID group basis;
- Percentage of control plane resources utilized on a per-PLMN ID group basis; and
- Equivalent of Composite Available Capacity, but referred to control plane capacity, on a per PLMN ID group basis.

Request, acknowledgement and failure reporting of this new parameter may be made in the resource status request, response and failure messages, respectively. Failure reporting includes a message that reporting of a parameter cannot be performed and therefore has failed.

In some embodiments, information exchanged as described above, i.e., per-sharing-operator resource utilization parameters, is used to decide whether to re-balance traffic across different cells on a per-cell or per-sharing-operator basis. Load balancing can be interpreted as the process to distribute resource utilization in a way that avoids loading above harmful thresholds and that optimizes the performance of a wide neighborhood of base stations.

The parameters to be considered for decisions regarding load balancing are any of those described above and methods for balancing may consist of handing over UEs to neighboring cells with spare capacity. Note also that per-sharing-operator load balancing can be interpreted as per-PLMN load balancing or per-PLMN-group load balancing. In some embodiments, the methods to perform load balancing may be based on decisions made by means of signaling and analysis of per-cell and per-sharing-operator load.

One way to reduce cell resource utilization is to allow the cell to serve fewer UEs or, in general, to allow less user plane and/or control plane traffic. For example, existing UEs may be disconnected, or new UEs seeking service in the cell may be rejected. Another way to reduce cell resource utilization is by disconnection or degradation of the service (e.g., limiting the available resources and bandwidth) of existing UEs or rejection of connection for incoming UEs, on a per-sharing-operator basis, i.e., on a per-PLMN or per-PLMN-group basis.

For example, when a cell resource utilization exceeds established thresholds, a base station or network node that controls the base station could decide to disconnect or degrade the service of UEs attached to a specific PLMN or PLMN group, due to the excess of load experienced in that PLMN or PLMN group. Alternatively, a base station may decide to reject connections for UEs connecting to one or more specific PLMNs. For example, during handover procedures, the handover signaling may indicate a target PLMN for the UE attempting handoff in a cell. This information, together with previously exchanged per-PLMN or per-PLMN-group cell resource utilization may be used to reject the UE access.

Another way to balance load is to change mobility thresholds towards neighboring cells in a way that UEs close to a neighbor cell edge can be moved to neighbor cells by means of handovers. A method to achieve this form of mobility load balancing includes modifying mobility parameters such as the Cell Individual Offset, i.e., the reference signal offset between source and target cell used for calculation of the handover trigger point, on a per-PLMN basis. For example, when UEs connected to certain PLMNs need to be offloaded to neighbor cells, these UEs could be subject to a handover trigger point that is specific to the particular PLMN that they are connected to. As an example, in LTE, a handover trigger point can be changed via X2 signaling. The Mobility Setting Change procedure, in fact, allows negotiation of mobility parameters between the source cell and the target cell. An enhancement of the Mobility Setting Change procedure may consist of addition in the MOBILITY CHANGE REQUEST message of PLMNs for which the change of mobility parameters is requested.

FIG. 8 is an example of such enhancements. FIG. 8 shows proposed changes to the mobility change request message. The mobility change request message 19 is no longer on a per-cell basis, but rather, are on a per-PLMN basis. Accordingly, FIG. 8 shows an entry that indicates a list of PLMN IDs, IE12, IE13, for a cell in a base station eNB1 where mobility settings need to be changed, and an entry that indicates a list of PLMN IDs, IE14, IE15, for a cell in a base station eNB2 where mobility settings need to be changed. The enhancements shown in FIG. 8 may be matched by corresponding enhancements to the MOBILITY CHANGE ACKNOWLEDGE message, and to the MOBILITY CHANGE FAILURE message, which may include a cause of a failure per PLMN. The failure message could indicate failure to support proposed new mobility parameters or more generally, a failure to complete the Mobility Setting Change procedure. Note that the enhancements to Mobility Setting Change procedures do not necessarily imply changes to the UE, because an eNB is free to apply the handover trigger point criteria that are best suited to a UE, without any changes to the procedures towards the UE.

Thus, some embodiments enable the exchange of cell resource utilization on a per PLMN basis. Further, some embodiments enable implementation of policies for mobility load balancing on a per-PLMN or per sharing-operator basis. Some embodiments enable monitoring and control of cell resources utilized by different parties such as operators sharing the same cells. Some embodiments provide a platform that enables movement of UEs between neighbor cells according to new criteria that take into account the resource utilization of the sharing operator serving each UE. For example, a base station may receive a mobility change request indicating a requested change in a mobility parameter for a PLMN associated with an operator. The mobility parameter may be changed by the receiving base station, and applied to handover decisions to alter the resource utilization of the PLMN.

Figure 9:
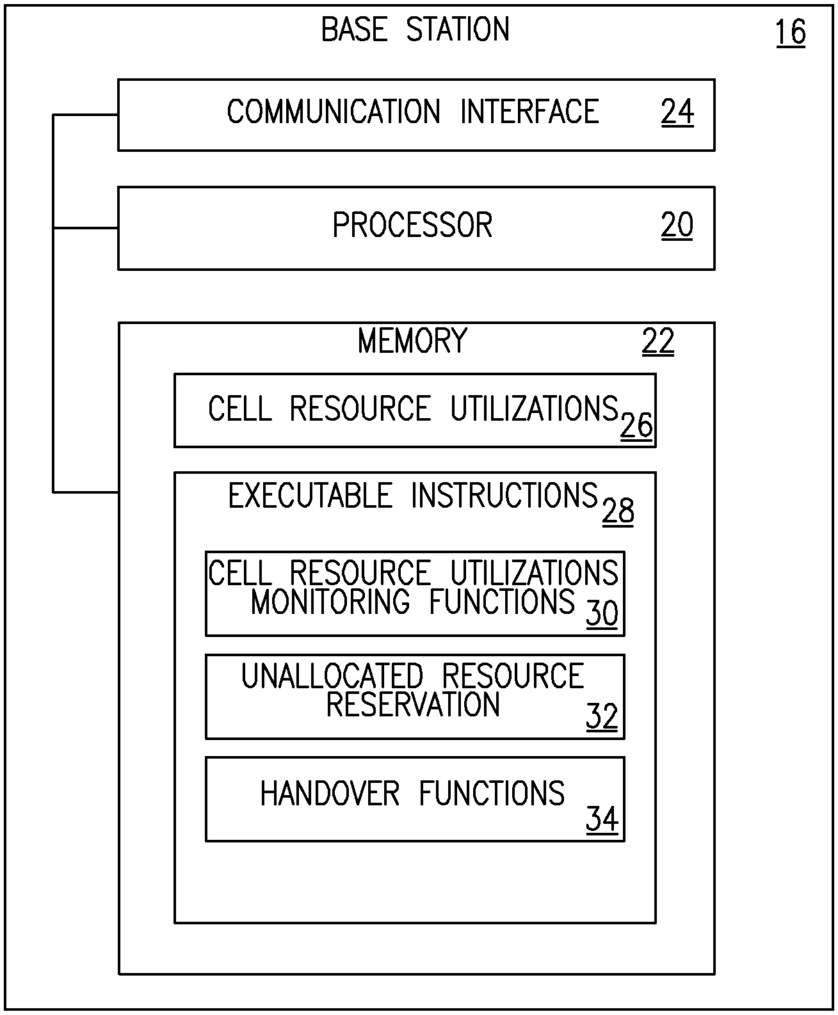
FIG. 9 is a block diagram of a base station constructed in accordance with principles of embodiments described herein.

FIG. 9 is a block diagram of a base station 16 constructed in accordance with some embodiments described herein. The base station 16 has a processor 20, a memory 22 and a communication interface 24. The processor 20 executes computer instructions 28 stored in the memory 22. The memory 22 stores cell resource utilizations 26 for each of a plurality of operators sharing the cell. The memory 22 also stores the executable instructions 28 that, when executed by the processor 20, configure the processor 20 to implement cell resource utilization monitoring functionality 30, unallocated resource reservation functionality 32, and handover functionality 34.

The cell resource utilization monitoring functionality 30 may include functionality to determine a utilization of cell resources on a per PLMN or per PLMN group basis, i.e., a per sharing operator basis. The unallocated resource reservation functionality 32 reserves an unallocated fraction of the cell resources which, in some embodiments, may be used when utilization of cell resources by an operator exceeds a resource utilization threshold. The handover functionality 34 functions to implement handover of one or more UEs from an operator whose cell resource utilization exceeds the resource utilization threshold pertaining to the operator. The communication interface 24 may be configured to receive a request for cell resource utilizations such as request message 13, IE11, by each operator sharing a cell and to transmit cell resource utilizations by each of the operators sharing the cell via of request update status message 15, IE2-9.

Figure 10:
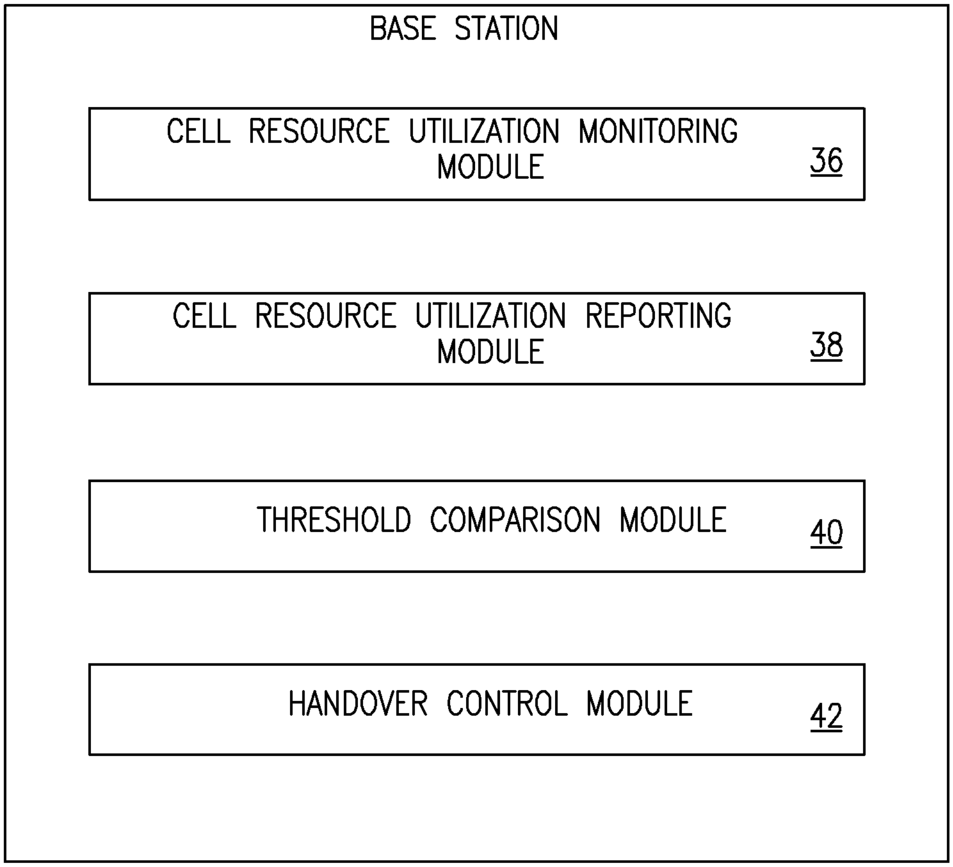
FIG. 10 is a block diagram of a base station constructed in accordance with principles of embodiments described herein.

FIG. 10 is a block diagram of a base station 16 that may be implemented by a computer program running on a processor. The computer program may consist of modules for performing various functions of the base station 16. A cell resource utilization monitoring module 36 is configured to monitor cell resource utilization for each of a plurality of PLMNs or PLMN groups, i.e., per sharing operator. A cell resource utilization reporting module 38 is configured to prepare per sharing operator reports 18, which includes per sharing operator resource utilization data per sharing operator to be reported in, for example, a cell resource update message 15, IE2-9, to be sent to another network node, such as another base station 16. A threshold comparison module 40 is configured to determine if a cell resource utilization of an operator exceeds the resource utilization threshold. A handover control module 42 is configured to effect a handover of user equipment from a sharing operator whose cell resource utilization exceeds the utilization threshold.

Figure 11:
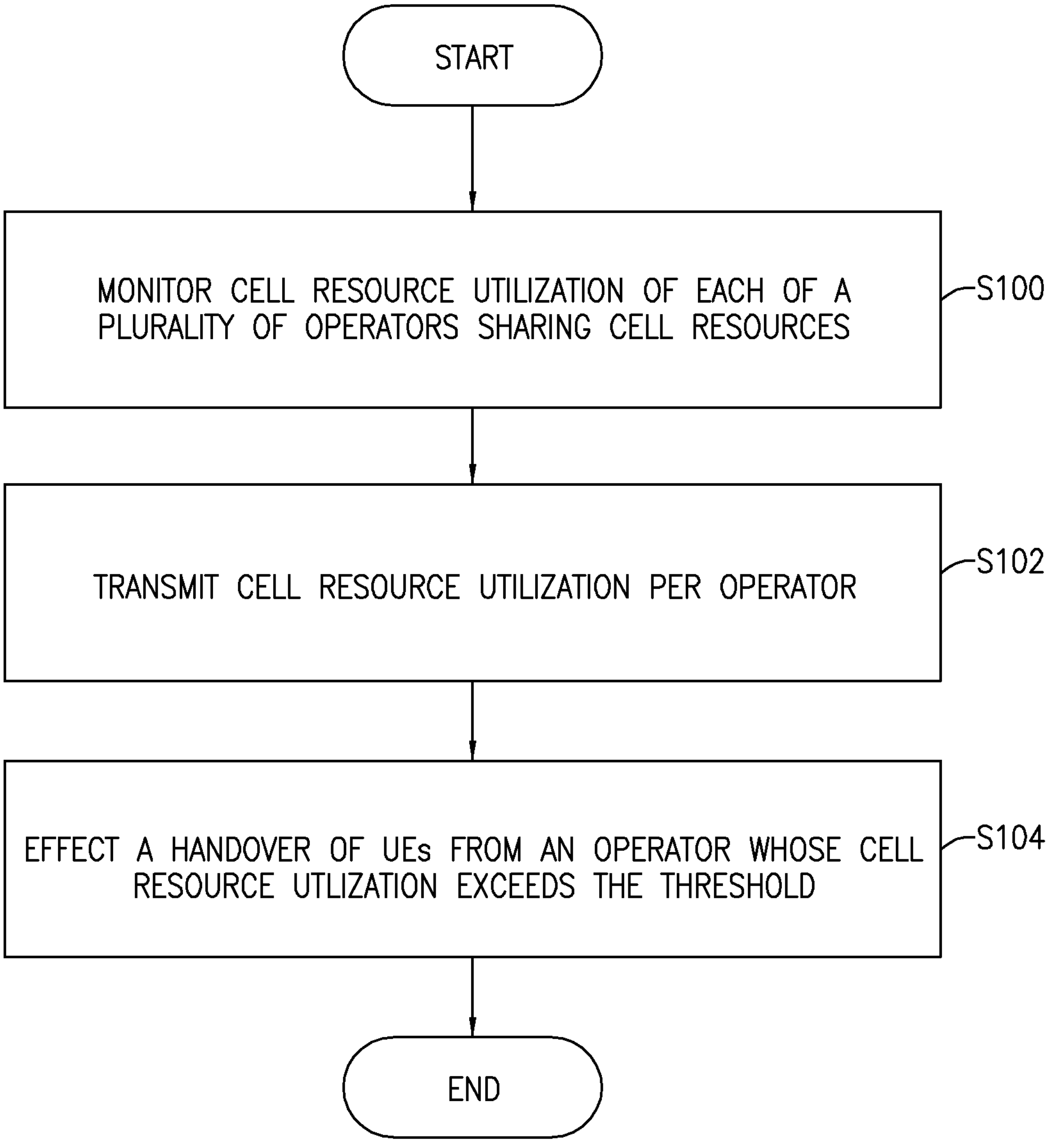
FIG. 11 is a flowchart of an exemplary process for monitoring and reporting of cell resource utilization per sharing operator.

FIG. 11 is a flowchart of an exemplary process for monitoring and reporting cell resource utilization among a plurality of operators sharing the cell resources. Cell resource utilization monitoring is performed for each of the sharing operators by a base station 16*a* (block S100). Cell resource utilization per sharing operator may then be reported to another cell node such as another base station 16*b* (block S102). A handover of one or more UEs 14 from an operator whose cell resource utilization exceeds a resource utilization threshold may be implemented (block S104).

Figure 12:
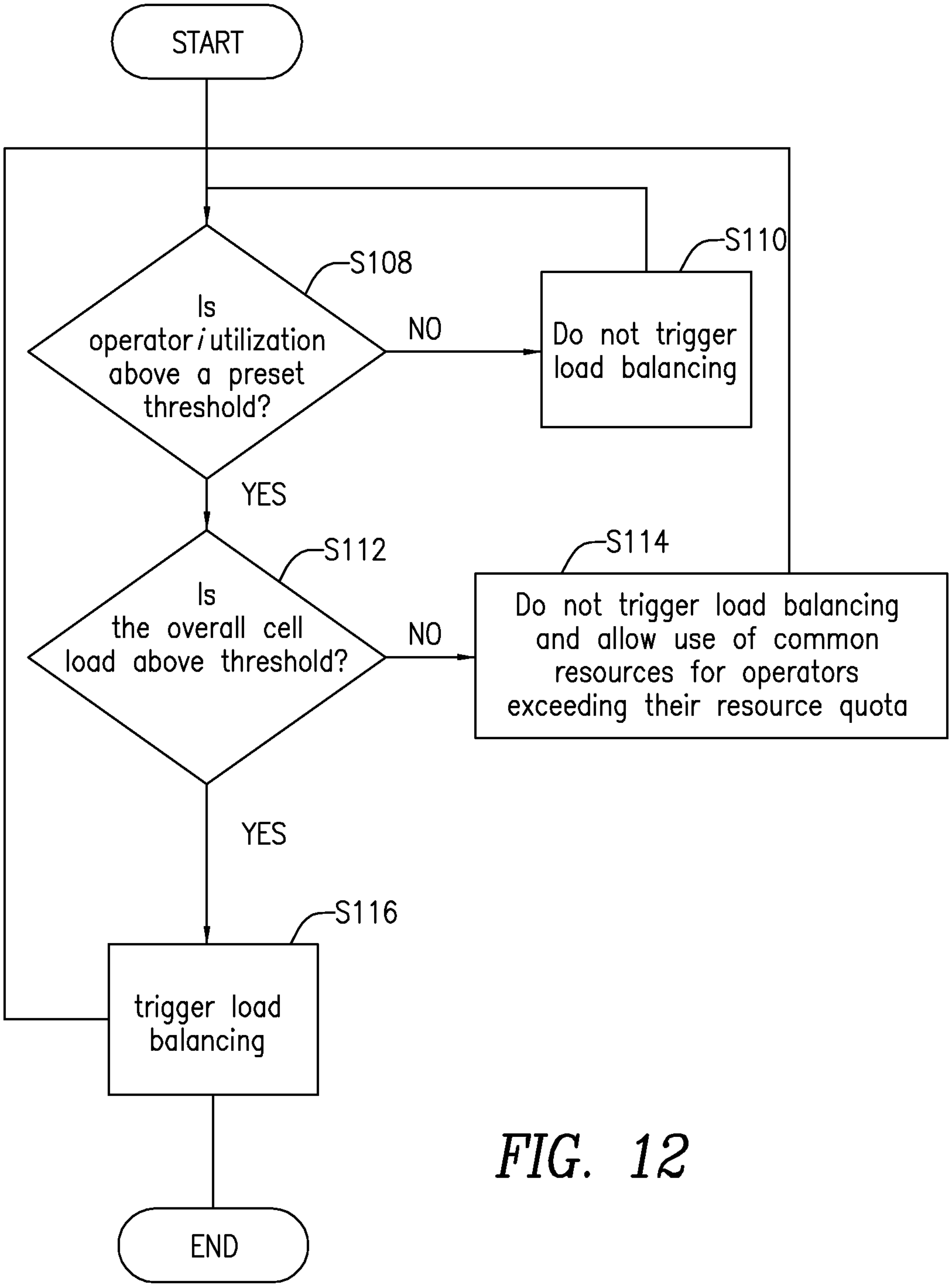
FIG. 12 is a flowchart of an exemplary process for load balancing triggering.

FIG. 12 is a flowchart of an exemplary process for load balancing of cell resources among a plurality of operators. The base station 16 may monitor cell resource utilization of the plurality of operators to determine if any of them exceed a resource utilization threshold (block S108). If not, then load balancing is not triggered (block S110). If an operator does exceed the resource utilization threshold, then the base station 16 determines if the overall cell load (the overall cell resource utilization) is over a second threshold (block S112). If not, load balancing is not triggered and common resources are allocated to operators exceeding their resource utilization thresholds (block S114). If the overall cell load does exceed the second threshold, load balancing is triggered (block S116).

Thus, in some embodiments, when a cell resource utilization of a first cell by a sharing operator exceeds a resource utilization threshold, UEs may be handed over from the first cell to a second cell. In some embodiments, when a cell resource utilization of a sharing operator exceeds the resource utilization threshold, an unallocated portion of cell resources is reallocated to the sharing operator exceeding the resource utilization threshold. In some embodiments, an unallocated portion of resources is reallocated to the operator exceeding its resource utilization threshold until an allocation of all cell resources exceeds a predetermined amount.

Figure 13:
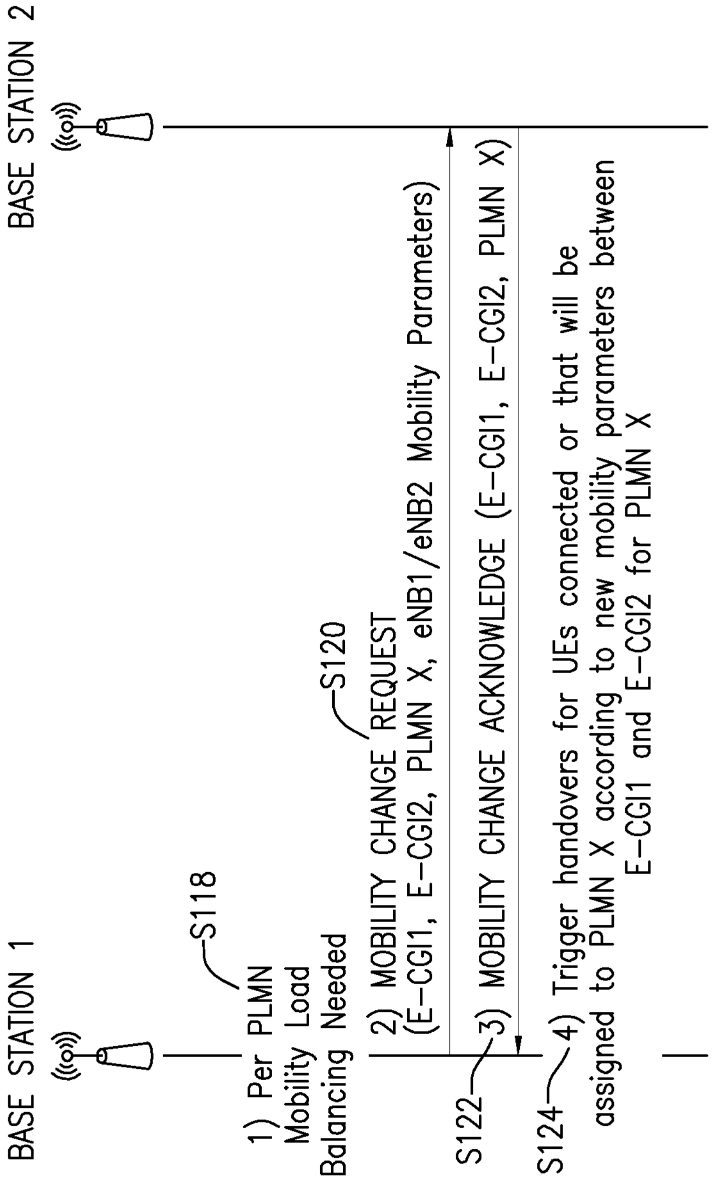
FIG. 13 shows negotiation of mobility parameters between two base stations on a per-cell, per-PLMN basis.

FIG. 13 shows negotiation of mobility parameters between two base stations on a per-cell, per-PLMN basis, which can be used to trigger per-PLMN mobility load balancing. The base station 1 determines that a per PLMN mobility load balance is needed (S118). This may be done according to the process of FIG. 12. In response, the base station 1 sends a MOBILITY CHANGE REQUEST to the eNB2 (S120). The base station 2 responds by sending a MOBILITY CHANGE ACKNOWLEDGEMENT to the base station 1 (S122). The base station 1 triggers handovers for UEs connected to, or that will be assigned to, the PLMN for which a mobility change was requested, according to new mobility parameters between EUTRAN cell global identity 1 (E-CGI1) and ECGI2 for the specified PLMN (S124). In the example of FIG. 13, the base stations negotiating new mobility parameters for PLMN X in E-CGI1 and E-CGI2 can simply apply these mobility parameters to the UEs 14 already connected or that will be connected to PLMN X. Such UEs will therefore obey the new settings for mobility.

Thus, some embodiments allow for exchanging cell resource utilization on a per PLMN basis and applying mobility load balancing on a per PLMN bases. Monitoring and control of resource utilization allocated to different sharing operators is enabled. Moreover, it is possible to move UEs between neighboring cells according to criteria that take into account resource utilization of sharing operators. Of note, although embodiments described herein are directed toward resource utilization, it is understood that the disclosure can be extended to resource availability, with information elements being used to report availability as opposed to utilization. In such an arrangement, resource availability for PLMNs is monitored and reported.

Embodiments described herein can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. Embodiments can also be embedded in a computer program product, which comprises all the features enabling the implementation of the methods described herein, and which, when loaded in a computing system is able to carry out these methods. Storage medium refers to any volatile or non-volatile tangible storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present disclosure is not limited to what has been particularly shown and described herein above. In addition, unless mention was made above to the contrary, it should be noted that all of the accompanying drawings are not to scale. A variety of modifications and variations are possible in light of the above teachings without departing from the following claims.

What is claimed is:

1. A method of reporting resource utilization by a plurality of operators sharing resources of a base station cell, the method comprising:

associating each of the plurality of operators with a different one of a plurality of public land mobile networks, PLMNs;

monitoring resource utilization for each PLMN;

transmitting resource utilization for each one of at least one of the plurality of PLMNs;

determining if a cell resource utilization of an operator exceeds a resource utilization threshold; and when a cell resource utilization by an operator exceeds the resource utilization threshold:

reallocating an unallocated portion of cell resources of the base station cell to the operator whose cell resource utilization exceeds the resource utilization threshold.

2. The method of claim 1, wherein the transmitted resource utilization is contained in a resource status report communicated over an interface to a requesting base station from a base station serving the base station cell.

3. The method of claim 2, wherein the interface is a third generation partnership project, 3GPP, X2 interface.

4. The method of claim 1, wherein the transmitted resource utilization includes control plane resources utilized by each of the plurality of PLMNs.

5. The method of claim 1, wherein the transmitted resource utilization includes data plane resources utilized by each of the plurality of PLMNs.

6. The method of claim 1, wherein, when a cell resource utilization of a first cell by an operator exceeds the resource utilization threshold, at least one user equipment associated with the operator and in communication via the first cell is handed over from the first cell to a second cell.

7. The method of claim 1, further comprising:

determining if a cell resource utilization by the plurality of operators exceeds the resource utilization threshold for the base station cell; and handing over at least one user equipment associated with an operator and in communication via the base station cell to another cell when the cell resource utilization of the plurality of operators exceeds the resource utilization threshold.

8. The method of claim 1, wherein an unallocated portion of resources is reallocated to the operator exceeding the resource utilization threshold until an allocation of all cell resources exceeds a predetermined amount.

9. A base station configured to serve at least one base station cell having resources shared by a plurality of operators, the base station comprising:

a communication interface configured to:

receive a request for cell resource utilizations by each of the plurality of operators;

transmit cell resource utilizations by each of the plurality of operators;

a processor; and a memory configured to store cell resource utilizations per operator of the plurality of operators;

the memory further configured to contain instructions executable by the processor to configure the processor to:

monitor cell resource utilization by each of the plurality of operators;

determine if a cell resource utilization of an operator exceeds a resource utilization threshold; and when a cell resource utilization by an operator exceeds the resource utilization threshold:

reallocate an unallocated portion of cell resources of the base station cell to the operator whose cell resource utilization exceeds the resource utilization threshold.

10. The base station of claim 9, wherein the communication interface is configured to receive the request from another base station.

11. The base station of claim 10, wherein the communication interface is configured to receive the requests over a third generation partnership project, 3GPP, X2 interface.

12. The base station of claim 9, wherein the processor is configured to determine an amount of cell resource utilization by an operator by determining an amount of cell resource utilization for each public land mobile network, PLMN, associated with the operator.

13. The base station of claim 9, wherein the processor is configured to cause handover of at least one user equipment from the operator of the plurality of operators whose cell resource utilization exceeds the resource utilization threshold.

* * * * *